US012400596B1

(12) United States Patent
Chang

(10) Patent No.: US 12,400,596 B1
(45) Date of Patent: Aug. 26, 2025

(54) SOURCE DRIVER HAVING GAMMA REFERENCE VOLTAGE GENERATOR WITH VOLTAGE CALCULATING CIRCUIT AND DISPLAY DEVICE THEREOF

(71) Applicant: HIMAX TECHNOLOGIES LIMITED, Tainan (TW)

(72) Inventor: Hui Wen Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/666,837

(22) Filed: May 17, 2024

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2310/0291* (2013.01); *G09G 2310/0297* (2013.01); *G09G 2320/0673* (2013.01); *G09G 2330/028* (2013.01)

(58) Field of Classification Search
CPC .................................................... G09G 3/3233
USPC ............................................................ 345/76
See application file for complete search history.

(56) References Cited

U.S. PATENT DOCUMENTS

2013/0271507 A1* 10/2013 Kim ..................... G09G 3/3291 345/77
2021/0043150 A1* 2/2021 Lee ...................... G09G 3/3291
2021/0327350 A1* 10/2021 Nam .................... G09G 3/3233
2022/0223091 A1* 7/2022 Chae .................... G09G 3/3225

* cited by examiner

*Primary Examiner* — Long D Pham
(74) *Attorney, Agent, or Firm* — CKC & Partners Co., LLC

(57) ABSTRACT

A gamma reference voltage generator includes a voltage difference generating circuit, a selection voltage generating circuit and a voltage calculating circuit. The voltage difference generating circuit generates a first voltage difference and a second voltage difference. The selection voltage generating circuit generates an initial voltage and receives a power source voltage and selectively outputs the initial voltage or the power source voltage as a selection voltage according to a voltage level of the power source voltage. The voltage calculating circuit receives the selection voltage, the first voltage difference and the second voltage difference and correspondingly output a first gamma reference voltage and a second gamma reference voltage, in which the first gamma reference voltage is a sum of the selection voltage and the first voltage difference, and the second gamma reference voltage is a difference between the selection voltage and the second voltage difference.

20 Claims, 6 Drawing Sheets

SOURCE DRIVER HAVING GAMMA REFERENCE VOLTAGE GENERATOR WITH VOLTAGE CALCULATING CIRCUIT AND DISPLAY DEVICE THEREOF

BACKGROUND

Field of Invention

The present invention relates to a gamma reference voltage generator. More particularly, the present invention relates to a gamma reference voltage generator, a source driver, and a display device thereof.

Description of Related Art

Organic light-emitting diode (OLED) displays have a variety of favorable characteristics such as wide viewing angles, rapid response speeds, relatively thin profiles, and low power consumption. OLED displays generate an emission current proportional to a voltage difference between a power source voltage (e.g., ELVDD) applied to a display panel and a source output signal. Therefore, the aforementioned voltage difference is desired to be unchanged so as to avoid a deviation of luminance of a display image between internal areas of the display panel.

SUMMARY

The present invention provides a gamma reference voltage generator. The gamma reference voltage generator includes a voltage difference generating circuit, a selection voltage generating circuit and a voltage calculating circuit. The voltage difference generating circuit is configured to generate a first voltage difference and a second voltage difference. The selection voltage generating circuit is configured to generate an initial voltage and receive a power source voltage and selectively output the initial voltage or the power source voltage as a selection voltage according to a voltage level of the power source voltage. The voltage calculating circuit is coupled to the voltage difference generating circuit and the selection voltage generating circuit to receive the selection voltage, the first voltage difference and the second voltage difference. The voltage calculating circuit is configured to output a first gamma reference voltage and a second gamma reference voltage, in which the first gamma reference voltage is a sum of the selection voltage and the first voltage difference, and the second gamma reference voltage is a difference between the selection voltage and the second voltage difference.

In accordance with one or more embodiments of the invention, the selection voltage generating circuit outputs the initial voltage as the selection voltage when the power source voltage is at low voltage level. The selection voltage generating circuit outputs the power source voltage as the selection voltage when the power source voltage is at high voltage level.

In accordance with one or more embodiments of the invention, the voltage calculating circuit includes an adder circuit to receive the selection voltage and the first voltage difference and correspondingly generate the first gamma reference voltage. The voltage calculating circuit includes a subtractor circuit to receive the selection voltage and the second voltage difference and correspondingly generate the second gamma reference voltage.

In accordance with one or more embodiments of the invention, the voltage difference generating circuit includes a first digital-analog converter (DAC) for converting a first digital code, a first non-inverting amplifier coupled to the first DAC, a second DAC for converting a second digital code, and a second non-inverting amplifier coupled to the second DAC. An output signal of the first DAC is inputted into the first non-inverting amplifier so that the first non-inverting amplifier outputs the first voltage difference. An output signal of the second DAC is inputted into the second non-inverting amplifier so that the second non-inverting amplifier outputs the second voltage difference.

In accordance with one or more embodiments of the invention, the selection voltage generating circuit includes a third DAC for converting a third digital code and a buffer amplifier coupled to the third DAC. An output signal of the third DAC is inputted into the buffer amplifier so that the buffer amplifier outputs the initial voltage.

In accordance with one or more embodiments of the invention, the selection voltage generating circuit includes a 2 to 1 multiplexer to receive the initial voltage and the power source voltage and correspondingly output the selection voltage according to a selection signal which represents that the power source voltage is at high voltage level or low voltage level.

The present invention further provides a source driver of a display device. The source driver includes a gamma reference voltage generator, a gamma voltage generator and a source signal generator. The gamma reference voltage generator is configured to generate a first gamma reference voltage and a second gamma reference voltage. The gamma voltage generator is coupled to the gamma reference voltage generator to receive the first gamma reference voltage and the second gamma reference voltage and correspondingly generate a plurality of gamma voltages. The source signal generator is coupled to the gamma voltage generator to receive the gamma voltages and correspondingly generate a plurality of source signals for supplying to a plurality of pixels of the display device, respectively. The gamma reference voltage generator includes a voltage difference generating circuit, a selection voltage generating circuit and a voltage calculating circuit. The voltage difference generating circuit is configured to generate a first voltage difference and a second voltage difference. The selection voltage generating circuit is configured to generate an initial voltage and receive a power source voltage and selectively output the initial voltage or the power source voltage as a selection voltage according to a voltage level of the power source voltage. The voltage calculating circuit is coupled to the voltage difference generating circuit and the selection voltage generating circuit to receive the selection voltage, the first voltage difference and the second voltage difference. The voltage calculating circuit is configured to output the first gamma reference voltage and the second gamma reference voltage, in which the first gamma reference voltage is a sum of the selection voltage and the first voltage difference, and the second gamma reference voltage is a difference between the selection voltage and the second voltage difference.

In accordance with one or more embodiments of the invention, the selection voltage generating circuit outputs the initial voltage as the selection voltage when the power source voltage is at low voltage level. The selection voltage generating circuit outputs the power source voltage as the selection voltage when the power source voltage is at high voltage level.

In accordance with one or more embodiments of the invention, the voltage calculating circuit includes an adder circuit to receive the selection voltage and the first voltage difference and correspondingly generate the first gamma reference voltage. The voltage calculating circuit includes a subtractor circuit to receive the selection voltage and the second voltage difference and correspondingly generate the second gamma reference voltage.

In accordance with one or more embodiments of the invention, the voltage difference generating circuit includes a first digital-analog converter (DAC) for converting a first digital code, a first non-inverting amplifier coupled to the first DAC, a second DAC for converting a second digital code, and a second non-inverting amplifier coupled to the second DAC. An output signal of the first DAC is inputted into the first non-inverting amplifier so that the first non-inverting amplifier outputs the first voltage difference. An output signal of the second DAC is inputted into the second non-inverting amplifier so that the second non-inverting amplifier outputs the second voltage difference.

In accordance with one or more embodiments of the invention, the selection voltage generating circuit includes a third DAC for converting a third digital code and a buffer amplifier coupled to the third DAC. An output signal of the third DAC is inputted into the buffer amplifier so that the buffer amplifier outputs the initial voltage.

In accordance with one or more embodiments of the invention, the selection voltage generating circuit includes a 2 to 1 multiplexer to receive the initial voltage and the power source voltage and correspondingly output the selection voltage according to a selection signal which represents that the power source voltage is at high voltage level or low voltage level.

The present invention yet provides a display device. The display device includes a pixel unit, a scan driver, and a source driver. The pixel unit includes pixels for receiving scan signals and source signals. The scan driver is configured to supply the scan signals to the pixels. The source driver is configured to supply the source signals to the pixels. The source driver includes a gamma reference voltage generator, a gamma voltage generator and a source signal generator. The gamma reference voltage generator is configured to generate a first gamma reference voltage and a second gamma reference voltage. The gamma voltage generator is coupled to the gamma reference voltage generator to receive the first gamma reference voltage and the second gamma reference voltage and correspondingly generate a plurality of gamma voltages. The source signal generator is coupled to the gamma voltage generator to receive the gamma voltages and correspondingly generate the source signals. The gamma reference voltage generator includes a voltage difference generating circuit, a selection voltage generating circuit and a voltage calculating circuit. The voltage difference generating circuit is configured to generate a first voltage difference and a second voltage difference. The selection voltage generating circuit is configured to generate an initial voltage and receive a power source voltage and selectively output the initial voltage or the power source voltage as a selection voltage according to a voltage level of the power source voltage. The voltage calculating circuit is coupled to the voltage difference generating circuit and the selection voltage generating circuit to receive the selection voltage, the first voltage difference and the second voltage difference. The voltage calculating circuit is configured to output the first gamma reference voltage and the second gamma reference voltage, in which the first gamma reference voltage is a sum of the selection voltage and the first voltage difference, and the second gamma reference voltage is a difference between the selection voltage and the second voltage difference.

In accordance with one or more embodiments of the invention, the selection voltage generating circuit outputs the initial voltage as the selection voltage when the power source voltage is at low voltage level. The selection voltage generating circuit outputs the power source voltage as the selection voltage when the power source voltage is at high voltage level.

In accordance with one or more embodiments of the invention, the voltage calculating circuit includes an adder circuit to receive the selection voltage and the first voltage difference and correspondingly generate the first gamma reference voltage. The voltage calculating circuit includes a subtractor circuit to receive the selection voltage and the second voltage difference and correspondingly generate the second gamma reference voltage.

In accordance with one or more embodiments of the invention, the voltage difference generating circuit includes a first digital-analog converter (DAC) for converting a first digital code, a first non-inverting amplifier coupled to the first DAC, a second DAC for converting a second digital code, and a second non-inverting amplifier coupled to the second DAC. An output signal of the first DAC is inputted into the first non-inverting amplifier so that the first non-inverting amplifier outputs the first voltage difference. An output signal of the second DAC is inputted into the second non-inverting amplifier so that the second non-inverting amplifier outputs the second voltage difference.

In accordance with one or more embodiments of the invention, the selection voltage generating circuit includes a third DAC for converting a third digital code and a buffer amplifier coupled to the third DAC. An output signal of the third DAC is inputted into the buffer amplifier so that the buffer amplifier outputs the initial voltage.

In accordance with one or more embodiments of the invention, the selection voltage generating circuit includes a 2 to 1 multiplexer to receive the initial voltage and the power source voltage and correspondingly output the selection voltage according to a selection signal which represents that the power source voltage is at high voltage level or low voltage level.

In accordance with one or more embodiments of the invention, the display device is OLED display device.

In accordance with one or more embodiments of the invention, the display device is AMOLED display device.

BRIEF DESCRIPTION OF THE DRAWINGS

The disclosure can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
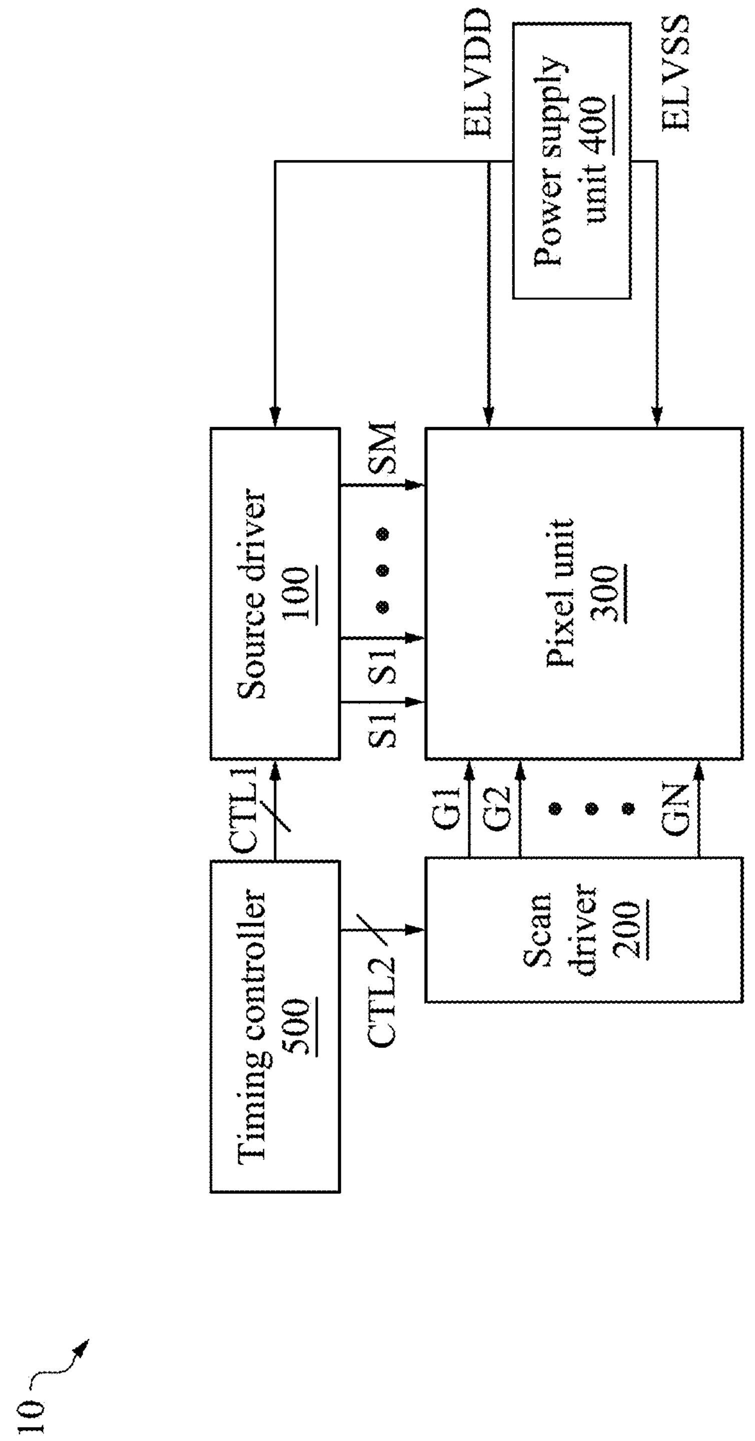
FIG. 1 illustrates a display device according to some embodiments of the present invention.

FIG. 1 illustrates a display device 10 according to some embodiments of the present invention. The display device 10 includes a source driver 100, a scan driver 200, a pixel unit 300 (also called a display panel), a power supply unit 400 and a timing controller 500. In some embodiments of the present invention, the display device 10 may be an OLED display device, an AMOLED (Active Matrix OLED) display device or the like.

The pixel unit 300 includes plural pixels (not shown). The pixel unit 300 is coupled to the source driver 100 via M source lines (shown as arrows between the pixel unit 300 and the source driver 100). The pixel unit 300 is coupled to the scan driver 200 via N scan lines (shown as arrows between the pixel unit 300 and the scan driver 200). Here, the pixels can be arranged at locations corresponding to crossing points of the source lines and the scan lines.

The pixels are driven by the scan signals and the source signals to emit light in accordance with the voltage levels of the source signals. The power source voltages ELVDD and ELVSS are applied to the pixels in order to drive the respective pixels. An exemplary embodiment of the pixel will be described below in detail with reference to FIG. 6.

The source driver 100 supplies plural source signals S1, S2, . . . , and SM to the pixels of the pixel unit 300 via the M source lines. The scan driver 200 supplies plural scan signals G1, G2, . . . , and GN to the pixels of the pixel unit 300 via the N scan lines. In other words, the pixel unit 300 includes M*N pixels for receiving scan signals and source signals (M and N are natural numbers).

The source signals corresponding to a gamma voltage are generated based on a voltage level of a gamma reference voltage. The source driver 100 generates the source signals according to an image data based at least in part on a gamma reference voltage. In other words, the source driver 100 generates the source signals corresponding to gamma voltages.

The power supply unit 400 is coupled to the pixel unit 300 to provide power source voltages ELVDD and ELVSS to the pixel unit 300. The power supply unit 400 is coupled to the source driver 100 to provide the power source voltage ELVDD to the source driver 100. The power source voltage ELVDD is a high power source voltage and the power source voltage ELVSS is a low power source voltage.

The timing controller 500 is coupled to the source driver 100 to control the source driver 100 based at least in part on control signals CTL1, such as a horizontal synchronization start signal STH and a load signal TP for providing reference timing so that the source driver 100 outputs the source signals accordingly. The timing controller 500 is coupled to the scan driver 200 to control the scan driver 200 based at least in part on control signals CTL2, such as a vertical synchronization start signal STV for selecting a first scan line, a gate clock signal CPV for sequentially selecting a next scan line, and an output enable signal OE for controlling the output of the scan driver 200 so that the scan driver 200 sequentially scans the pixels.

The timing controller 500 receives input control signals and an image data signal from an image source such as an external graphic apparatus. The input control signals can include a main clock signal, a vertical synchronizing signal (Vsync), a horizontal synchronizing signal (Hsync), and a data enable signal.

In some embodiments, the display device 10 further includes an emission control unit that outputs an emission scan signal for controlling light emitting operations of the pixels included in the pixel unit 300, and the said emission scan signal will be described below in detail with reference to FIG. 6.

Figure 2:
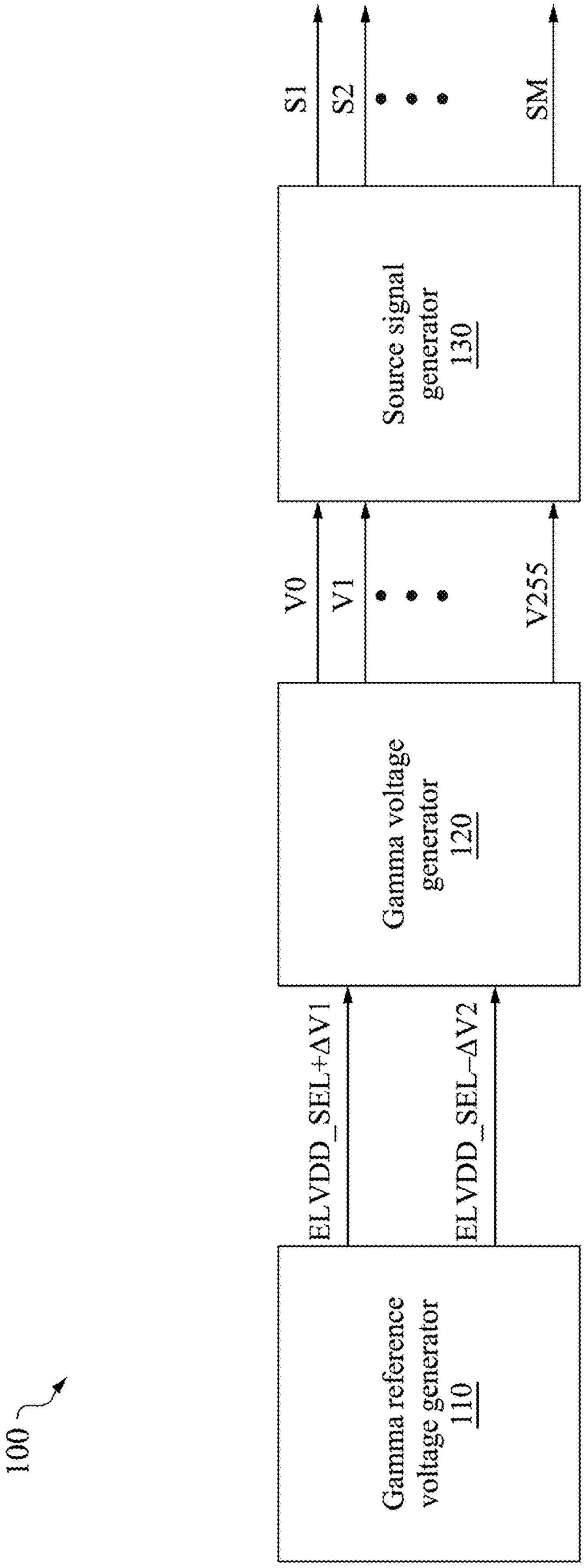
FIG. 2 illustrates a block diagram of a source driver of the display device according to some embodiments of the present invention.

FIG. 2 illustrates a block diagram of the source driver 100 of the display device 10 according to some embodiments of the present invention. The source driver 100 includes a gamma reference voltage generator 110, a gamma voltage generator 120 and a source signal generator 130. The gamma reference voltage generator 110 generates a first gamma reference voltage (labelled as ELVDD_SEL+ΔV1 in FIG. 2) and a second gamma reference voltage (labelled as ELVDD_SEL−ΔV2 in FIG. 2). The gamma voltage generator 120 is coupled to the gamma reference voltage generator 110 to receive the first gamma reference voltage (ELVDD_SEL+ΔV1) and the second gamma reference voltage (ELVDD_SEL−ΔV2) and correspondingly generate plural gamma voltages V1, V2, . . . , and V255. The source signal generator 130 is coupled to the gamma voltage generator 120 to receive the gamma voltages V0 through V255 and correspondingly generate the source signals S1, S2, . . . , and SM corresponding to the respective gamma voltages V0 through V255.

Figure 3:
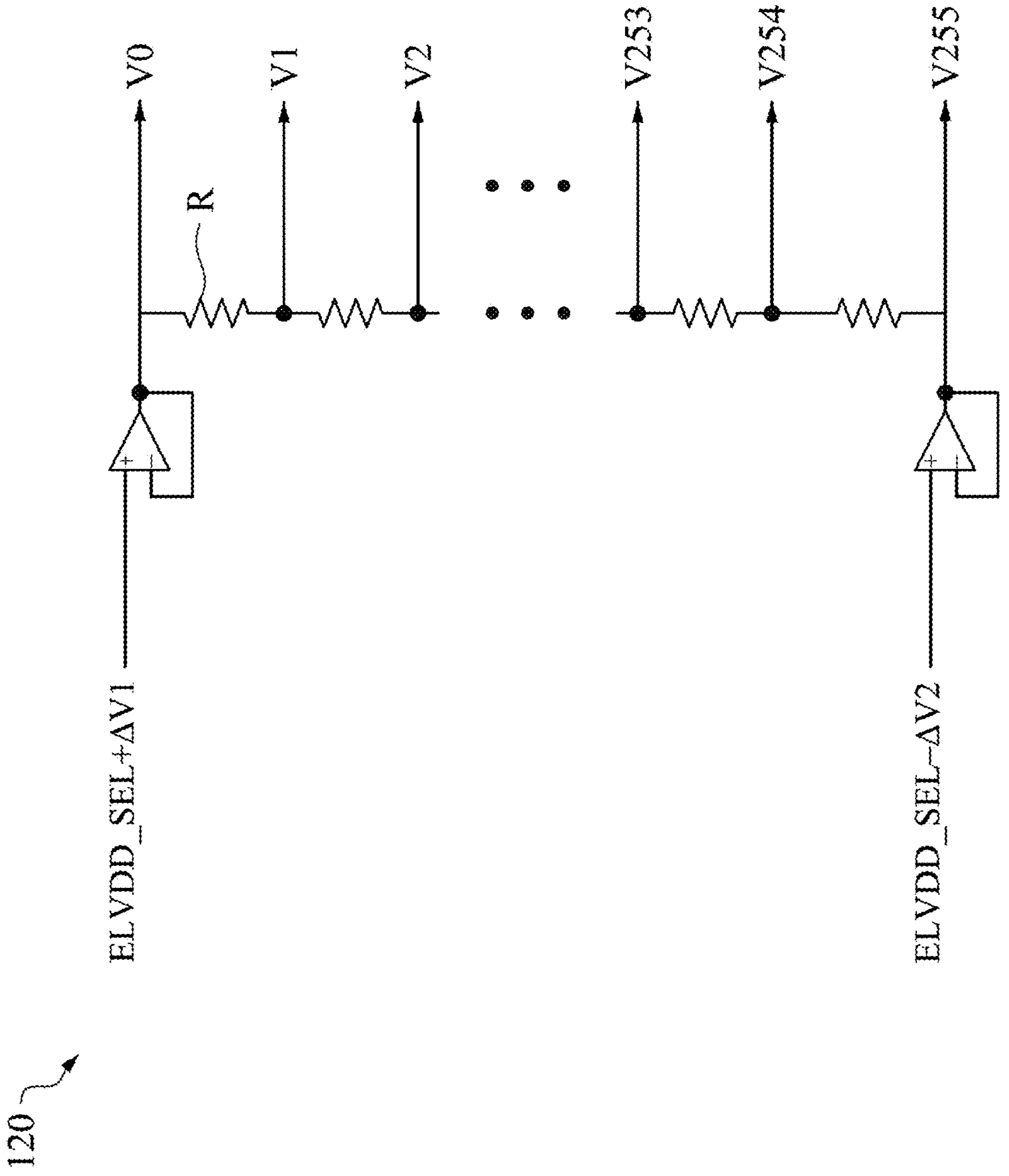
FIG. 3 illustrates an example of a gamma voltage generator according to some embodiments of the present invention.

FIG. 3 illustrates an example of the gamma voltage generator 120 according to some embodiments of the present invention. The gamma voltage generator 120 includes a plurality of serially connected resistors R and divides the first gamma reference voltage (ELVDD_SEL+ΔV1) and the second gamma reference voltage (ELVDD_SEL−ΔV2) through the resistors R to generate the gamma voltages V0 through V255.

The gamma voltage generator 120 can generate different gamma voltages for the data signals. In addition, the number of the gamma voltages V0 through V255 can vary in accordance with the structure of a resistor string and is not limited to 256. Specifically, the first gamma reference voltage (ELVDD_SEL+ΔV1) is a maximum value of the gamma voltage (e.g., the pixel unit 300 emits light to have a maximum luminance level and a maximum gray level) and the second gamma reference voltage (ELVDD_SEL−ΔV2) is a minimum value of the gamma voltage (e.g., the pixel unit 300 emits light to have a minimum luminance level and a minimum gray level).

Figure 4:
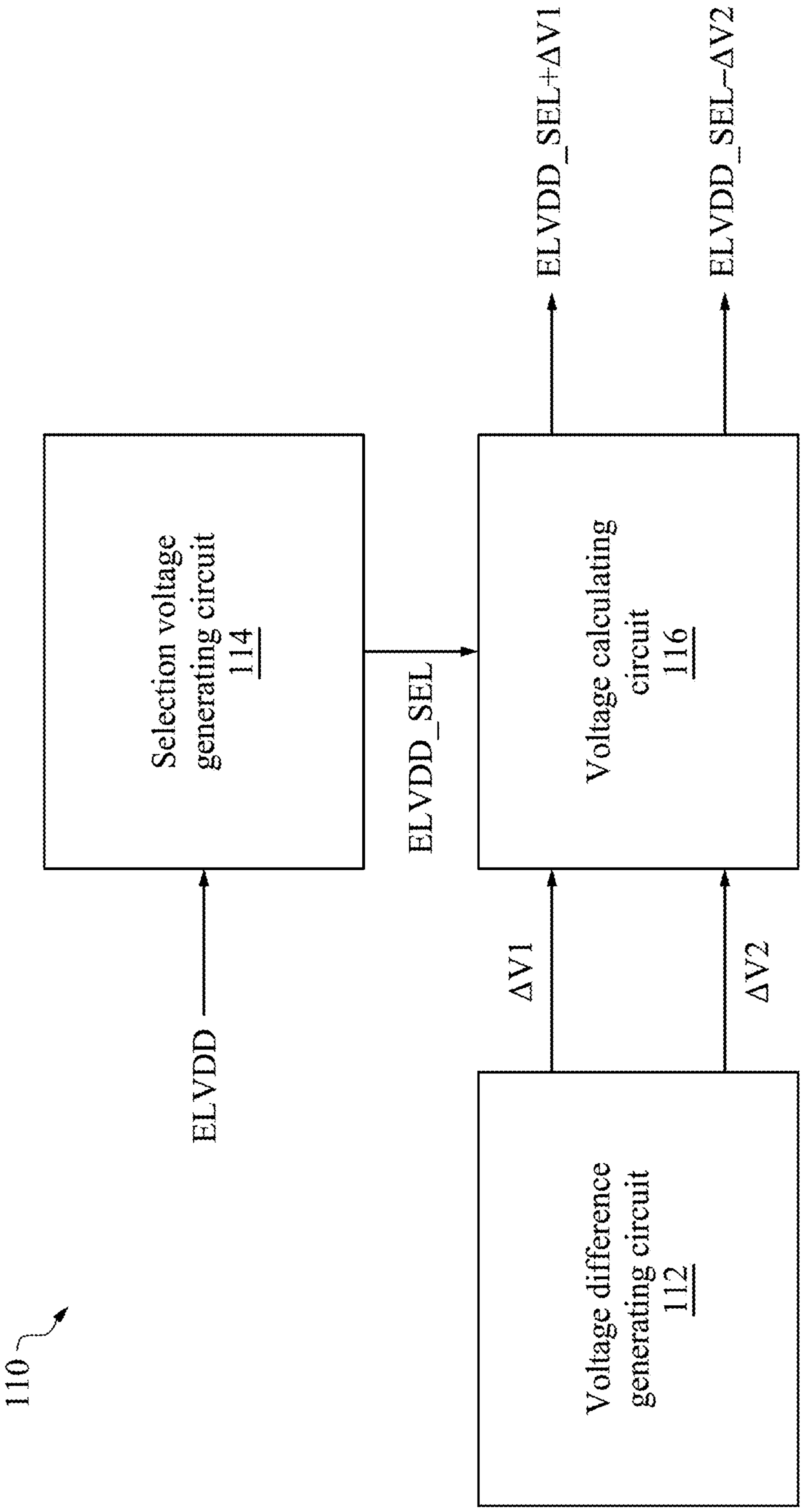
FIG. 4 illustrates a block diagram of a gamma reference voltage generator according to some embodiments of the present invention.

FIG. 4 illustrates a block diagram of the gamma reference voltage generator 110 according to some embodiments of the present invention. The gamma reference voltage generator 110 includes a voltage difference generating circuit 112, a selection voltage generating circuit 114 and a voltage calculating circuit 116. The voltage difference generating circuit 112 generates a first voltage difference ΔV1 and a second voltage difference ΔV2. The selection voltage generating circuit 114 generates an initial voltage (not shown and will be described below with reference to FIG. 5) and receives the power source voltage ELVDD (from the power supply unit 400) and selectively outputs the initial voltage or the power source voltage ELVDD as a selection voltage ELVDD_SEL according to a voltage level of the power source voltage ELVDD (will be described below in detail with reference to FIG. 5). The voltage calculating circuit 116 is coupled to the voltage difference generating circuit 112 and the selection voltage generating circuit 114 to receive the selection voltage ELVDD_SEL, the first voltage difference ΔV1 and the second voltage difference ΔV2. The voltage calculating circuit outputs the first gamma reference voltage (ELVDD_SEL+ΔV1) and the second gamma reference voltage (ELVDD_SEL−ΔV2). Specifically, the first gamma reference voltage (ELVDD_SEL+ΔV1) is a sum of the selection voltage ELVDD_SEL and the first voltage difference ΔV1, and the second gamma reference voltage (ELVDD_SEL−ΔV2) is a difference between the selection voltage ELVDD_SEL and the second voltage difference ΔV2.

Figure 5:
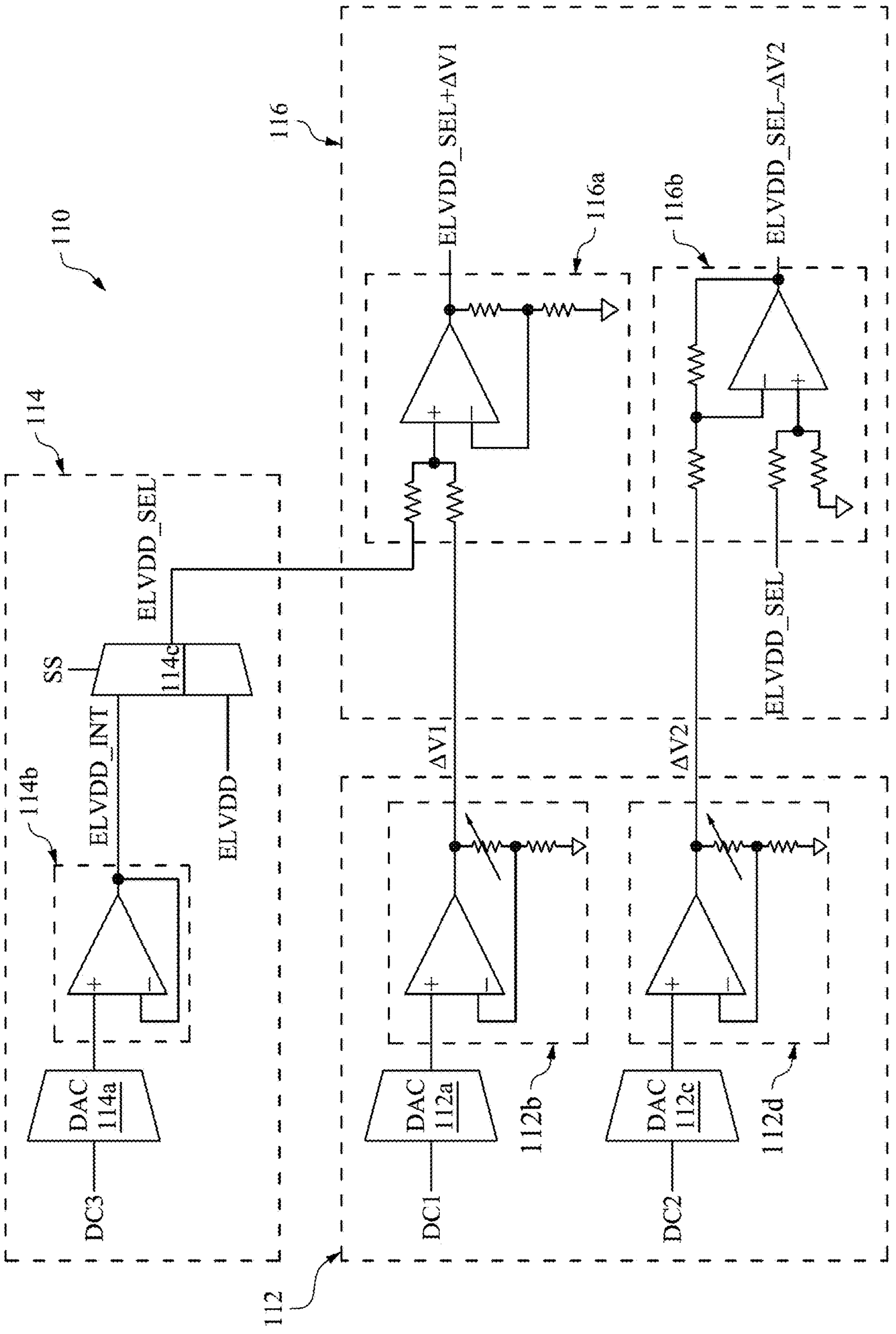
FIG. 5 illustrates an example of the gamma reference voltage generator according to some embodiments of the present invention.

FIG. 5 illustrates an example of the gamma reference voltage generator 110 according to some embodiments of the present invention. The voltage difference generating circuit 112 includes a first DAC 112*a* for converting a first digital code DC1, a first non-inverting amplifier 112*b* coupled to the first DAC, a second DAC 112*c* for converting a second digital code DC2, and a second non-inverting amplifier 112*d* coupled to the second DAC 112*c*. An output signal of the first DAC 112*a* is inputted into the first non-inverting amplifier 112*b* so that the first non-inverting amplifier 112*b* outputs the first voltage difference ΔV1. An output signal of the second DAC 112*c* is inputted into the second non-inverting amplifier 112*d* so that the second non-inverting amplifier 112*d* outputs the second voltage difference ΔV2. The first digital code DC1 is a digital signal which can be determined by designer for setting a value of the first voltage difference ΔV1. The second digital code DC2 is a digital signal which can be determined by designer for setting a value of the second voltage difference ΔV2.

The selection voltage generating circuit 114 includes a third DAC 114*a* for converting a third digital code DC3 and a buffer amplifier 114*b* coupled to the third DAC 114*a*. An output signal of the third DAC 114*a* is inputted into the buffer amplifier 114*b* so that the buffer amplifier 114*b* outputs the initial voltage ELVDD_INT. The third digital code DC3 is a digital signal which can be determined by designer for setting a value of the initial voltage ELVDD_INT.

The selection voltage generating circuit 114 further includes a 2 to 1 multiplexer 114*c* to receive the initial voltage ELVDD_INT and the power source voltage ELVDD and correspondingly output the selection voltage ELVDD_SEL according to a selection signal SS which represents that the power source voltage ELVDD is at high voltage level or low voltage level. In other words, the selection voltage generating circuit 114 outputs the initial voltage ELVDD_INT as the selection voltage ELVDD_SEL when the power source voltage ELVDD is at low voltage level, and the selection voltage generating circuit 114 outputs the power source voltage ELVDD as the selection voltage ELVDD_SEL when the power source voltage ELVDD is at high voltage level.

The voltage calculating circuit 116 includes an adder circuit 116*a* to receive the selection voltage ELVDD_SEL and the first voltage difference ΔV1 and correspondingly generate the first gamma reference voltage (ELVDD_SEL+ΔV1). The voltage calculating circuit 116 includes a subtractor circuit 116*b* to receive the selection voltage ELVDD_SEL and the second voltage difference ΔV2 and correspondingly generate the second gamma reference voltage (ELVDD_SEL−ΔV2).

Figure 6:
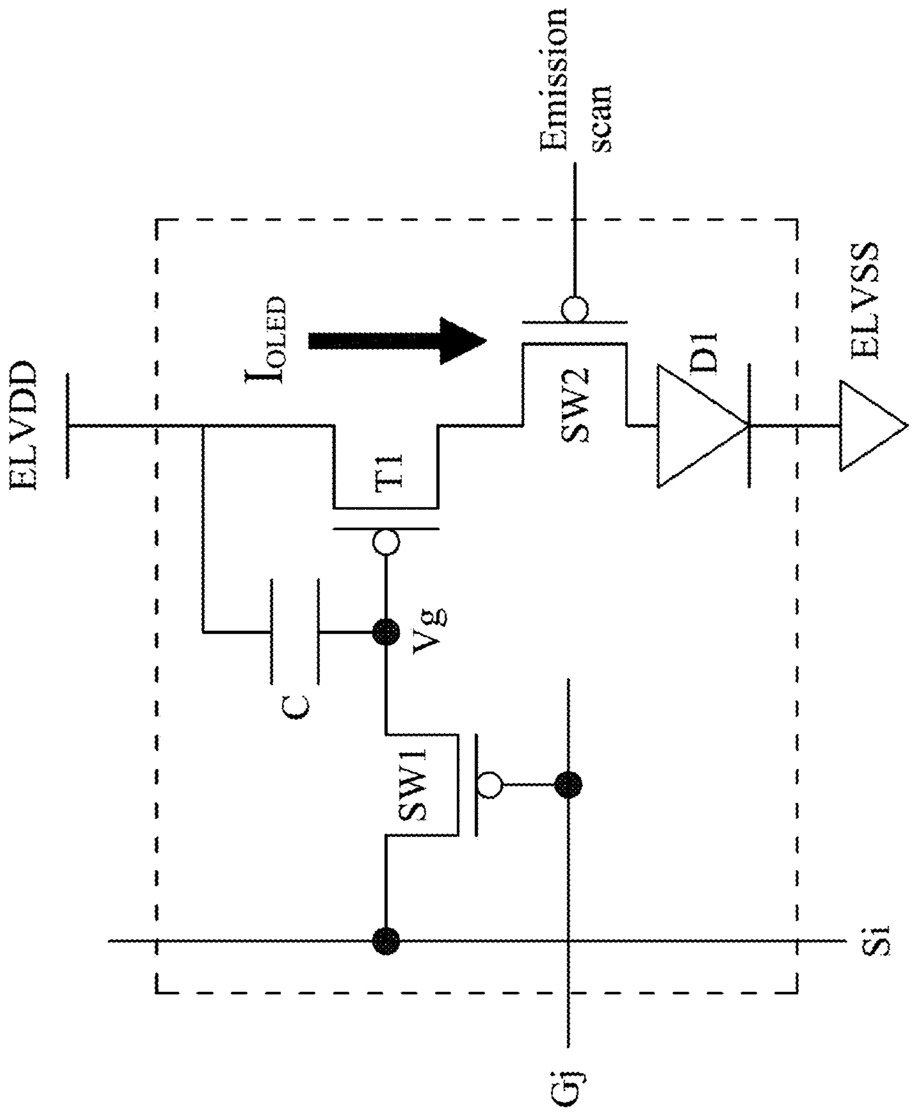
FIG. 6 is a view illustrating an exemplary embodiment of a pixel.

FIG. 6 is a view illustrating an exemplary embodiment of a pixel. A pixel according to an exemplary embodiment may include a switching transistor SW1, a driving transistor T1, a controlling transistor SW2, a storage capacitor C, and an organic light emitting diode (OLED) D1. When a scan signal Gj (i.e., one of G1, G2, . . . , and GN) is applied, the switching transistor SW1 is turned on and the source signal Si (i.e., one of S1, S2, . . . , and SM) is applied to a first node Vg. Therefore, the voltage of the first node Vg may be the voltage level of the source signal Si.

An emission scan signal controls the controlling transistor SW2 to be turned on so as to control light emitting operations of the OLED D1, such that the driving transistor T1 outputs a driving current $I_{OLED}$ determined by a voltage difference between a gate electrode and a source electrode and a threshold voltage Vthp as illustrated in EQUATION 1 to the OLED D1.

$$I_{OLED}=K(\mathrm{ELVDD}-Vg-|\mathrm{Vthp}|)^2 \qquad \text{[EQUATION 1]}$$

In FIG. 6, the voltage difference between the voltage of the gate electrode and the voltage of the source electrode is the same as a difference between the power source voltage ELVDD and the voltage of the first node Vg, i.e., (ELVDD−Vg).

As shown in EQUATION 1, the driving current $I_{OLED}$ flowed through the OLED D1 will be affected when the power source voltage ELVDD is changed. Therefore, it is desired that the voltage of the first node Vg (i.e., the voltage level of the source signal Si) is changed with the power source voltage ELVDD, so that the voltage difference (ELVDD−Vg) is fixed so as to maintain the driving current $I_{OLED}$ flowed through the OLED D1 to be unchanged and the brightness deviation is removed from the display device 10 and a high quality image may be displayed.

As shown in FIG. 2, the voltage level of the source signal Si (i.e., one of S1, S2, . . . , and SM) corresponds to the first gamma reference voltage (ELVDD_SEL+ΔV1) and the second gamma reference voltage (ELVDD_SEL−ΔV2). As shown in FIG. 4 and FIG. 5, the first gamma reference voltage (ELVDD_SEL+ΔV1) and the second gamma reference voltage (ELVDD_SEL−ΔV2) correspond to the power source voltage ELVDD when the power source voltage ELVDD is at high voltage level, and the first gamma reference voltage (ELVDD_SEL+ΔV1) and the second gamma reference voltage (ELVDD_SEL−ΔV2) correspond to the initial voltage ELVDD_INT when the power source voltage ELVDD is at low voltage level. Specifically, the disclosed gamma reference voltage generator 110 generates the first gamma reference voltage (ELVDD_SEL+ΔV1) and the second gamma reference voltage (ELVDD_SEL−ΔV2) tracking the power source voltage ELVDD, such that the voltage level of the source signal varied with the power source voltage ELVDD so as to maintain the voltage difference (ELVDD−Vg) to be fixed. To sum up, the disclosed gamma reference voltage generator 110 can maintain the driving current $I_{OLED}$ flowed through the OLED D1 to be unchanged.

The present invention further has the following advantages. The area of the circuit is reduced because the simple circuit design, and thus the cost of production is reduced accordingly and the power consumption is reduced accordingly. The number of the control signals with respect to the digital code is reduced. The selection voltage generating circuit for detecting the power source voltage ELVDD is located at the middle stage of the gamma reference voltage generator rather than the rear stage, and thus the jiggle of the output voltage of the gamma reference voltage generator is reduced.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A gamma reference voltage generator, comprising:

a voltage difference generating circuit configured to generate a first voltage difference and a second voltage difference;

a selection voltage generating circuit configured to generate an initial voltage and receive a power source voltage and selectively output the initial voltage or the power source voltage as a selection voltage according to a voltage level of the power source voltage; and a voltage calculating circuit coupled to the voltage difference generating circuit and the selection voltage generating circuit to receive the selection voltage, the first voltage difference and the second voltage difference;

wherein the voltage calculating circuit is configured to output a first gamma reference voltage and a second gamma reference voltage, wherein the first gamma reference voltage is a sum of the selection voltage and the first voltage difference, wherein the second gamma reference voltage is a difference between the selection voltage and the second voltage difference.

2. The gamma reference voltage generator of claim 1, wherein the selection voltage generating circuit outputs the initial voltage as the selection voltage when the power source voltage is at low voltage level, wherein the selection voltage generating circuit outputs the power source voltage as the selection voltage when the power source voltage is at high voltage level.

3. The gamma reference voltage generator of claim 1, wherein the voltage calculating circuit comprises an adder circuit to receive the selection voltage and the first voltage difference and correspondingly generate the first gamma reference voltage, wherein the voltage calculating circuit comprises a subtractor circuit to receive the selection voltage and the second voltage difference and correspondingly generate the second gamma reference voltage.

4. The gamma reference voltage generator of claim 1, wherein the voltage difference generating circuit comprises a first digital-analog converter (DAC) for converting a first digital code, a first non-inverting amplifier coupled to the first DAC, a second DAC for converting a second digital code, and a second non-inverting amplifier coupled to the second DAC, wherein an output signal of the first DAC is inputted into the first non-inverting amplifier so that the first non-inverting amplifier outputs the first voltage difference, wherein an output signal of the second DAC is inputted into the second non-inverting amplifier so that the second non-inverting amplifier outputs the second voltage difference.

5. The gamma reference voltage generator of claim 1, wherein the selection voltage generating circuit comprises a third DAC for converting a third digital code and a buffer amplifier coupled to the third DAC, wherein an output signal of the third DAC is inputted into the buffer amplifier so that the buffer amplifier outputs the initial voltage.

6. The gamma reference voltage generator of claim 1, wherein the selection voltage generating circuit comprises a 2 to 1 multiplexer to receive the initial voltage and the power source voltage and correspondingly output the selection voltage according to a selection signal which represents that the power source voltage is at high voltage level or low voltage level.

7. A source driver of a display device, comprising:

a gamma reference voltage generator configured to generate a first gamma reference voltage and a second gamma reference voltage;

a gamma voltage generator coupled to the gamma reference voltage generator to receive the first gamma reference voltage and the second gamma reference voltage and correspondingly generate a plurality of gamma voltages; and a source signal generator coupled to the gamma voltage generator to receive the gamma voltages and correspondingly generate a plurality of source signals for supplying to a plurality of pixels of the display device, respectively;

wherein the gamma reference voltage generator comprises:

a voltage difference generating circuit configured to generate a first voltage difference and a second voltage difference;

a selection voltage generating circuit configured to generate an initial voltage and receive a power source voltage and selectively output the initial voltage or the power source voltage as a selection voltage according to a voltage level of the power source voltage; and a voltage calculating circuit coupled to the voltage difference generating circuit and the selection voltage generating circuit to receive the selection voltage, the first voltage difference and the second voltage difference;

wherein the voltage calculating circuit is configured to output the first gamma reference voltage and the second gamma reference voltage, wherein the first gamma reference voltage is a sum of the selection voltage and the first voltage difference, wherein the second gamma reference voltage is a difference between the selection voltage and the second voltage difference.

8. The source driver of claim 7, wherein the selection voltage generating circuit outputs the initial voltage as the selection voltage when the power source voltage is at low voltage level, wherein the selection voltage generating circuit outputs the power source voltage as the selection voltage when the power source voltage is at high voltage level.

9. The source driver of claim 7, wherein the voltage calculating circuit comprises an adder circuit to receive the selection voltage and the first voltage difference and correspondingly generate the first gamma reference voltage, wherein the voltage calculating circuit comprises a subtractor circuit to receive the selection voltage and the second voltage difference and correspondingly generate the second gamma reference voltage.

10. The source driver of claim 7, wherein the voltage difference generating circuit comprises a first DAC for converting a first digital code, a first non-inverting amplifier coupled to the first DAC, a second DAC for converting a second digital code, and a second non-inverting amplifier coupled to the second DAC, wherein an output signal of the first DAC is inputted into the first non-inverting amplifier so that the first non-inverting amplifier outputs the first voltage difference, wherein an output signal of the second DAC is inputted into the second non-inverting amplifier so that the second non-inverting amplifier outputs the second voltage difference.

11. The source driver of claim 7, wherein the selection voltage generating circuit comprises a third DAC for converting a third digital code and a buffer amplifier coupled to the third DAC, wherein an output signal of the third DAC is inputted into the buffer amplifier so that the buffer amplifier outputs the initial voltage.

12. The source driver of claim 7, wherein the selection voltage generating circuit comprises a 2 to 1 multiplexer to receive the initial voltage and the power source voltage and correspondingly output the selection voltage according to a selection signal which represents that the power source voltage is at high voltage level or low voltage level.

13. A display device, comprising:
- a pixel unit including pixels for receiving scan signals and source signals;
- a scan driver configured to supply the scan signals to the pixels; and
- a source driver configured to supply the source signals to the pixels, wherein the source driver comprises:
  - a gamma reference voltage generator configured to generate a first gamma reference voltage and a second gamma reference voltage;
  - a gamma voltage generator coupled to the gamma reference voltage generator to receive the first gamma reference voltage and the second gamma reference voltage and correspondingly generate a plurality of gamma voltages; and
  - a source signal generator coupled to the gamma voltage generator to receive the gamma voltages and correspondingly generate the source signals;
  - wherein the gamma reference voltage generator comprises:
    - a voltage difference generating circuit configured to generate a first voltage difference and a second voltage difference;
    - a selection voltage generating circuit configured to generate an initial voltage and receive a power source voltage and selectively output the initial voltage or the power source voltage as a selection voltage according to a voltage level of the power source voltage; and
    - a voltage calculating circuit coupled to the voltage difference generating circuit and the selection voltage generating circuit to receive the selection voltage, the first voltage difference and the second voltage difference;
  - wherein the voltage calculating circuit is configured to output the first gamma reference voltage and the second gamma reference voltage, wherein the first gamma reference voltage is a sum of the selection voltage and the first voltage difference, wherein the second gamma reference voltage is a difference between the selection voltage and the second voltage difference.

14. The display device of claim 13, wherein the selection voltage generating circuit outputs the initial voltage as the selection voltage when the power source voltage is at low voltage level, wherein the selection voltage generating circuit outputs the power source voltage as the selection voltage when the power source voltage is at high voltage level.

15. The display device of claim 13, wherein the voltage calculating circuit comprises an adder circuit to receive the selection voltage and the first voltage difference and correspondingly generate the first gamma reference voltage, wherein the voltage calculating circuit comprises a subtractor circuit to receive the selection voltage and the second voltage difference and correspondingly generate the second gamma reference voltage.

16. The display device of claim 13, wherein the voltage difference generating circuit comprises a first DAC for converting a first digital code, a first non-inverting amplifier coupled to the first DAC, a second DAC for converting a second digital code, and a second non-inverting amplifier coupled to the second DAC, wherein an output signal of the first DAC is inputted into the first non-inverting amplifier so that the first non-inverting amplifier outputs the first voltage difference, wherein an output signal of the second DAC is inputted into the second non-inverting amplifier so that the second non-inverting amplifier outputs the second voltage difference.

17. The display device of claim 13, wherein the selection voltage generating circuit comprises a third DAC for converting a third digital code and a buffer amplifier coupled to the third DAC, wherein an output signal of the third DAC is inputted into the buffer amplifier so that the buffer amplifier outputs the initial voltage.

18. The display device of claim 13, wherein the selection voltage generating circuit comprises a 2 to 1 multiplexer to receive the initial voltage and the power source voltage and correspondingly output the selection voltage according to a selection signal which represents that the power source voltage is at high voltage level or low voltage level.

19. The display device of claim 13, wherein the display device is OLED display device.

20. The display device of claim 13, wherein the display device is AMOLED display device.

* * * * *